United States Patent [19]
Benford

[11] Patent Number: 5,588,929
[45] Date of Patent: Dec. 31, 1996

[54] FOUR-SPEED AUTOMATIC TRANSMISSION

[75] Inventor: Howard L. Benford, Bloomfield Hills, Mich.

[73] Assignee: Chrysler Corporation, Auburn Hills, Mich.

[21] Appl. No.: 345,669

[22] Filed: Nov. 28, 1994

[51] Int. Cl.$^6$ .................................................. F16H 3/62
[52] U.S. Cl. ....................... 475/276; 475/277; 475/279
[58] Field of Search .................................. 475/275, 276, 475/277, 278, 279, 280, 288, 290, 296

[56] References Cited

U.S. PATENT DOCUMENTS

| | | | |
|---|---|---|---|
| 3,811,343 | 5/1974 | Mori et al. | 475/285 |
| 3,956,946 | 5/1976 | Murakami et al. | 475/276 |
| 3,987,690 | 10/1976 | Murakami et al. | 475/276 |
| 4,027,552 | 6/1977 | Murakami et al. | 475/280 |
| 4,875,391 | 10/1989 | Leising et al. | 477/155 |
| 4,963,124 | 10/1990 | Takahashi et al. | 475/278 |
| 5,188,575 | 2/1993 | Leising et al. | 475/280 |

FOREIGN PATENT DOCUMENTS

| | | | |
|---|---|---|---|
| 2483553 | 12/1981 | France . | |
| 2-129447 | 5/1990 | Japan | 475/280 |
| 2249361 | 5/1992 | United Kingdom . | |

OTHER PUBLICATIONS

Powerful Revolution: Three New V-8 Models Launch The BMW 5-Series For 1994; BMW of North America, Inc. Press Release.
BMW 540i In Which A Good Eight Replaces A Great Six In The Old Five; Car and Driver; By John Phillip; Sep. 1993; pp. 79–82.
See Serial No.: 08/271,313, Filed: Jul. 6, 1994.
See Serial No.: 08/190,958, Filed: Feb. 3, 1994.
See Serial No.: 08/271,314 –Filed: Jul. 6, 1994.

*Primary Examiner*—Charles A. Marmor
*Assistant Examiner*—Sherry Lynn Estremsky
*Attorney, Agent, or Firm*—Thomas G. Pasternak

[57] ABSTRACT

A four speed automatic transmission for a vehicle includes a transmission housing, an input member, an output member, three planetary gearsets for changing a ratio of torque between the input member and the output member, a plurality of clutch assemblies to selectively couple the input member to predetermined gears of the planetary gearsets, a plurality of brake assemblies to selectively couple predetermined gears of the planetary gearsets to the transmission housing, and a structure for allowing the output member and a planetary carrier from one of the planetary gearsets and an annulus gear of another of the planetary gearsets to rotate simultaneously.

17 Claims, 2 Drawing Sheets

| GEAR | RATIO* | FRICTION ELEMENTS APPLIED | | | | | | |
|------|--------|----|----|---|---|---|--------|-----|
|      |        | UD | OD | R | 4 | 2 | LR     | L-FW |
| 1    | 3.00   | X  |    |   |   |   | MAN LO | X   |
| 2    | 1.67   | X  |    |   |   | X |        |     |
| 3    | 1.00   | X  | X  |   |   |   |        |     |
| 4    | 0.75   |    | X  |   | X |   |        |     |
| R    | -3.00  |    |    | X |   |   | X      |     |

| GEAR | RATIO* | FRICTION ELEMENTS APPLIED | | | | | | |
|---|---|---|---|---|---|---|---|---|
| | | UD | OD | R | 4 | 2 | LR | L-FW |
| 1 | 3.00 | X | | | | | MAN LO | X |
| 2 | 1.50 | X | | | X | | | |
| 3 | 1.00 | X | X | | | | | |
| 4 | 0.67 | | X | | | X | | |
| R | -3.00 | | | X | | | X | |

FOUR-SPEED AUTOMATIC TRANSMISSION

BACKGROUND OF THE INVENTION

1. Field of the Invention

The present invention relates generally to automatic transmissions for vehicles and, more particularly, to a four-speed automatic transmission for an automotive vehicle.

2. Description of the Related Art

A conventional automatic transmission includes a hydrodynamic torque converter to transfer engine torque from an engine crankshaft to a rotatable input member of the transmission through fluid-flow forces. The transmission also includes frictional units, typically referred to as clutches, which couple the rotatable input member to one or more members of a planetary gearset. Other frictional units, typically referred to as brakes, hold one or more members of the planetary gearset stationary during the flow of power. Such transmissions also typically provide for one or more planetary gearsets in order to provide various ratios of torque and to ensure that the available torque and the respective tractive power demand are matched to each other.

An example of an automatic transmission having a plurality of planetary gearsets is a four-speed automatic transmission disclosed in U.S. Pat. No. 4,875,391 to Leising et al. This patented four-speed automatic transmission includes a torque converter with a lock-up clutch, three drive clutch assemblies, two brake assemblies, and two planetary gearsets.

A disadvantage of the above patented four-speed automatic transmission is that to provide a 0.75 overdrive ratio in the arrangement of the planetary gearsets results in an excessive ratio step between first and second gear, e.g., 3.00 and 1.50, respectively.

SUMMARY OF THE INVENTION

It is, therefore, one object of the present invention to provide a four-speed automatic transmission for an automotive vehicle.

It is another object of the present invention to provide a four-speed automatic transmission with a 0.75 overdrive ratio.

It is yet another object of the present invention to provide a four-speed automatic transmission that provides an acceptable ratio step between first and second gear.

It is still another object of the present invention to provide a four-speed automatic transmission with a unique planetary gear arrangement which, relative to today's four-speed units, provides a 0.75 overdrive ratio with good ratio spacing.

To achieve the foregoing objects, the present invention is a four-speed automatic transmission for a vehicle including a transmission housing, an input member, an output member, three planetary gearsets for changing a ratio of torque between the input member and the output member, a plurality of clutch assemblies to selectively couple the input member to predetermined gears of the planetary gearsets and a plurality of brake assemblies to selectively couple predetermined gears of the planetary gearsets to the transmission housing, and means for allowing the output member and a planetary carrier of one of the planetary gearsets and an annulus gear of another of the planetary gearsets to rotate simultaneously.

One advantage of the present invention is that a four-speed automatic transmission is provided for an automotive vehicle. Another advantage of the present invention is that the four-speed automatic transmission provides an arrangement of planetary gearsets to achieve a 0.75 overdrive ratio. Yet another advantage of the present invention is that the four-speed automatic transmission achieves a 0.75 overdrive ratio while providing an acceptable ratio step between first and second gear. Still another advantage of the present invention is that the four-speed automatic transmission provides a unique arrangement of the planetary gearsets to achieve a 0.75 overdrive ratio with good ratio spacing, especially between first and second gear.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figures 1, 2:
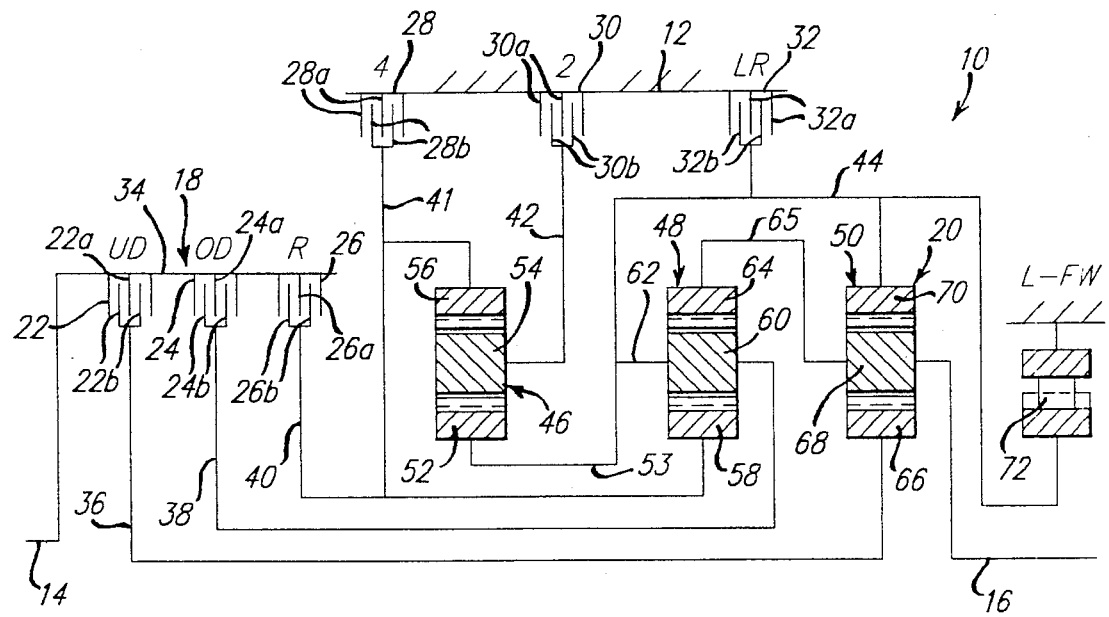
FIG. 1 is a cross-sectional schematic view of a four-speed automatic transmission according to the present invention.
FIG. 2 is a chart of gear ratio and friction elements applied for the various normally-used gears of the four-speed automatic transmission of FIGS. 1 or 3.

Referring to FIG. 1, a cross-sectional schematic of a four-speed automatic transmission, according to the present invention, is partially shown at 10. The four-speed automatic transmission 10 is adapted for use in a vehicle (not shown) such as an automotive vehicle. The four-speed automatic transmission 10 is similar to the four-speed automatic transmission disclosed in U.S. Pat. No. 4,875,391, the disclosure of which is hereby incorporated by reference, except for that specifically illustrated and described herein.

The four-speed automatic transmission 10 includes a transmission housing 12, an input member 14, an output member 16, a multi-clutch and brake assembly, generally indicated at 18, and a gear assembly generally indicated at 20. The transmission housing 12 is stationary relative to the rotatable input member 14, output member 16 and gear assembly 20.

The multi-clutch and brake assembly 18 allows predetermined gears within the gear assembly 20 to be selectively engaged and disengaged from either the input member 14 or the transmission housing 12. Near the input side of the transmission 10, the multi-clutch and brake assembly 18 includes an underdrive clutch assembly 22 (applied in first, second and third gears), an overdrive clutch assembly 24 (applied in third and fourth gears) and a reverse clutch assembly 26 (applied in reverse gear). Near the output side of the transmission 10, the multi-clutch and brake assembly 18 includes a fourth brake assembly 28 (applied in fourth gear), a second brake assembly 30 (applied in second gear) and a low-reverse brake assembly 32 (applied in first and reverse gears).

The underdrive clutch assembly 22 includes a plurality of axially spaced annular plates 22a and a plurality of axially spaced annular discs 22b which are alternated between the plates 22a and when the underdrive clutch assembly 22 is not applied, these plates 22a and discs 22b are free to move or rotate relative to each other. The plates 22a are mounted to an input retainer 34 operatively connected to the input member 14. The discs 22b are mounted to an underdrive hub 36 operatively connected to the gear assembly 20.

The overdrive clutch assembly 24 includes a plurality of axially spaced annular plates 24a and a plurality of axially spaced annular discs 24b. The plates 24a and discs 24b are similar to those of the underdrive clutch assembly 22. The plates 24a are mounted to the input retainer 34 and the discs 24b are mounted to an overdrive hub 38 operatively connected to the gear assembly 20.

The reverse clutch assembly 26 includes a plurality of axially spaced annular plates 26a and a plurality of axially spaced annular discs 26b. The plates 26a and discs 26b are similar to those of the underdrive clutch assembly 22. The plates 26a are mounted to the input retainer 34 and the discs 26b are mounted to a reverse hub 40 operatively connected to the gear assembly 20. It should be appreciated that the clutch assemblies 22, 24 and 26 are applied by fluid actuating devices (not shown).

The fourth brake assembly 28 includes a plurality of axially spaced annular plates 28a and a plurality of axially spaced annular discs 28b. The plates 28a and discs 28b are similar to those of the underdrive clutch assembly 22. The plates 28a are mounted to the transmission housing 12 and the discs 28b are mounted to a first hub 41 connected to the reverse hub 40.

The second brake assembly 30 includes a plurality of axially spaced annular plates 30a and a plurality of axially spaced annular discs 30b. The plates 30a and discs 30b are similar to those of the underdrive clutch assembly 22. The plates 30a are mounted to the transmission housing 12 and the discs 30b are mounted to a second hub 42 operatively connected to the gear assembly 20.

The low/reverse brake assembly 32 includes a plurality of axially spaced annular plates 32a and a plurality of axially spaced annular discs 32b. The plates 32a and discs 32b are similar to those of the underdrive clutch assembly 22. The plates 32a are mounted to the transmission housing 12 and the discs 32b are mounted to a first connecting member 44 of the gear assembly 20 to be described further herein. It should be appreciated that the brake assemblies 28, 30 and 32 are applied by fluid actuating devices (not shown).

The gear assembly 20 includes a front or first planetary gearset, generally indicated at 46, an axially spaced intermediate or second planetary gearset, generally indicated at 48, and an axially spaced rear or third planetary gearset, generally indicated at 50. The first planetary gearset 46 includes a first sun gear 52 at its center. The first sun gear 52 is connected by a second connecting member 53 to the second planetary gearset 48 to be described. The first planetary gearset 46 also includes a first planetary carrier 54 having a plurality of circumferentially spaced first pinion gears to engage the first sun gear 52. The first planetary carrier 54 is connected to the second brake assembly 30. The first planetary gearset 46 further includes a first annulus gear 56 disposed about the first planetary carrier 54 and which engages the first pinion gears. The first annulus gear 56 is connected to the reverse hub 40 and first hub 41. The ratio of the number of teeth on the sun gear 52 to the number of teeth on the annulus gear 56 in this example is 0.50.

The intermediate or second planetary gearset 48 includes a second sun gear 58 at its center which is connected to the reverse hub 40, first hub 41 and first annulus gear 56. The second planetary gearset 48 also includes a second planetary carrier 60 having a plurality of circumferentially spaced second pinion gears to engage the second sun gear 58. The second planetary carrier 60 includes a third connecting member 62 connected to the first connecting member 44 and second connecting member 53. The second planetary carrier 60 also is connected to the overdrive hub 38. The second planetary gearset 48 further includes a second annulus gear 64 disposed about the second planetary carrier 60 and which engages the second pinion gears. The second annulus gear 64 is connected by a fourth connecting member 65 to the third planetary gearset 50 to be described. The ratio of the number of teeth on the sun gear 58 to the number of teeth on the annulus gear 64 in this example is 0.33.

The rear or third planetary gearset 50 includes a third sun gear 66 at its center which is connected to the underdrive hub 36. The third planetary gearset 50 also includes a third planetary carrier 68 having a plurality of circumferentially spaced third pinion gears to engage the third sun gear 66. The third planetary carrier 68 is connected to the fourth connecting member 65 and to the output member 16 of the transmission 10. The third planetary gearset 50 further includes a third annulus gear 70 disposed about the third planetary carrier 68 and which engages the third pinion gears. The third annulus gear 70 is connected to the first connecting member 44. The first connecting member 44 is connected to a one-way or freewheel clutch 72 to prevent reverse rotation of the first connecting member 44. The ratio of the number of teeth on the sun gear 66 to the number of teeth on the annulus gear 70 in this example is 0.50.

In operation, the input member 14 of the transmission 10 rotates due to torque being transferred from the rotating crankshaft of the engine and through the torque converter (not shown) to the input member 14. The input retainer 34 also rotates with the input member 14 due to its connection. The input retainer 34 and plates 22a, 24a, 26a also rotate with the input member 14 due to the connection of the input retainer 34 to the input member 14.

When the underdrive clutch assembly 22 is applied, the rotating plates 22a and discs 22b of the underdrive clutch assembly 22 engage each other and a frictional force is produced between the plates 22a and discs 22b. Because the input retainer 34 and plates 22a are rotating, the frictional force causes the discs 22b and underdrive hub 36 to rotate, in turn, rotating the sun gear 66 of the third planetary gearset 50.

When the overdrive clutch assembly 24 is applied, the rotating plates 24a and discs 24b of the overdrive clutch assembly 24 engage each other and a frictional force is produced between the plates 24a and discs 24b. Because the input retainer 34 and plates 24a are rotating, the frictional force causes the discs 24b and overdrive hub 38 to rotate, in turn, rotating the second planetary carrier 60, third connecting member 62, first connecting member 44, second connecting member 53, first sun gear 52 and third annulus gear 70.

When the reverse clutch assembly 26 is applied, the rotating plates 26a and discs 26b of the reverse clutch assembly 26 engage each other and a frictional force is produced between the plates 26a and discs 26b. Because the input retainer 34 and plates 26a are rotating, the frictional force causes the discs 26b and reverse hub 40 to rotate, in turn, rotating the second sun gear 58 and first annulus gear 56.

When the fourth brake assembly 28 is applied, the plates 28a and discs 28b of the fourth brake assembly 28 engage each other and a frictional force is produced between the plates 28a and discs 28b. Because the plates 28a do not rotate or are stationary, as they are connected to the transmission housing 12, the frictional force holds the discs 28b and first hub 41 stationary, in turn, holding the second sun gear 58 and first annulus gear 56 stationary.

When the second brake assembly 30 is applied, the plates 30a and discs 30b of the second brake assembly 30 engage each other and a frictional force is produced between the plates 30a and discs 30b. Because the plates 30a are stationary, as they are connected to the transmission housing 12, the frictional force holds the discs 30b and second hub 42 stationary, in turn, holding the first planetary carrier 54 of the first planetary gearset 46 stationary.

When the low/reverse brake assembly 32 is applied, the plates 32a and discs 32b of the low/reverse brake assembly 32 engage each other and a frictional force is produced between the plates 32a and discs 32b. Because the plates 32a are stationary, as they are connected to the transmission housing 12, the frictional force holds the discs 32b stationary, in turn, holding the first connecting member 44, second connecting member 53, first sun gear 52, third connecting member 62, second planetary carrier 60, and third annulus gear 70 stationary.

Referring to FIG. 2, when the transmission 10 is desired to operate in first gear, the underdrive clutch assembly 22 is applied. This causes the third sun gear 66 to rotate and the third annulus gear 70 to be held stationary by the one-way clutch 72. As a result, rotation of the third sun gear 66 causes rotation of the third pinion gears and the third planetary carrier 68. Because the output member 16 is connected to the third planetary carrier 68, rotation of the third planetary carrier 68 causes the output member 16 to rotate. This arrangement of the gear assembly 20 produces a gear ratio of 3.00.

When the transmission 10 is desired to operate in second gear, the underdrive clutch assembly 22 and the second brake assembly 30 are applied. This causes the third sun gear 66 to rotate and the first planetary carrier 54 to be held stationary. By holding the first planetary carrier 54 stationary, the first sun gear 52 and third annulus gear 70 rotate, in turn, further rotating the third pinion gears and the third planetary carrier 68 which increase in speed. As a result, the third planetary carrier 68 and output member 16 rotate at a greater r.p.m. than in first gear. This arrangement of the gear assembly 20 produces a gear ratio of 1.67.

When the transmission 10 is desired to operate in third gear, the underdrive clutch assembly 22 and the overdrive clutch assembly 24 are applied. This causes the third sun gear 66 and third annulus gear 70 to rotate at the same r.p.m. As a result, the third planetary carrier 68 and output member 16 also rotate at the same r.p.m., which is at a higher r.p.m. than in second gear. This arrangement of the gear assembly 20 produces a gear ratio of 1.00.

When the transmission 10 is desired to operate in fourth gear, the overdrive clutch assembly 24 and the fourth brake assembly 28 are applied. This causes the second planetary carrier 60 to rotate and the second sun gear 58 to be held stationary. As a result, rotation of the second planet carrier 60 causes the second pinion gears and second annulus gear 64 to rotate. Rotation of the second annulus gear 64 causes the output member 16 to rotate at a greater r.p.m. than in third gear. This arrangement of the gear assembly 20 produces a gear ratio of 0.75.

When the transmission 10 is desired to operate in reverse gear, the reverse clutch assembly 26 and low/reverse brake assembly 32 are applied. This causes the second sun gear 58 to rotate and the second planetary carrier 60 to be held stationary. As a result, the second sun gear 58 rotates the second pinion gears which, in turn, rotate the second annulus gear 64 backwards. Rotation of the second annulus gear 64 causes rotation of the output member 16 in a direction opposite to the other gear positions. This arrangement of the gear assembly 20 produces a gear ratio of −3.00.

Figures 3, 4:
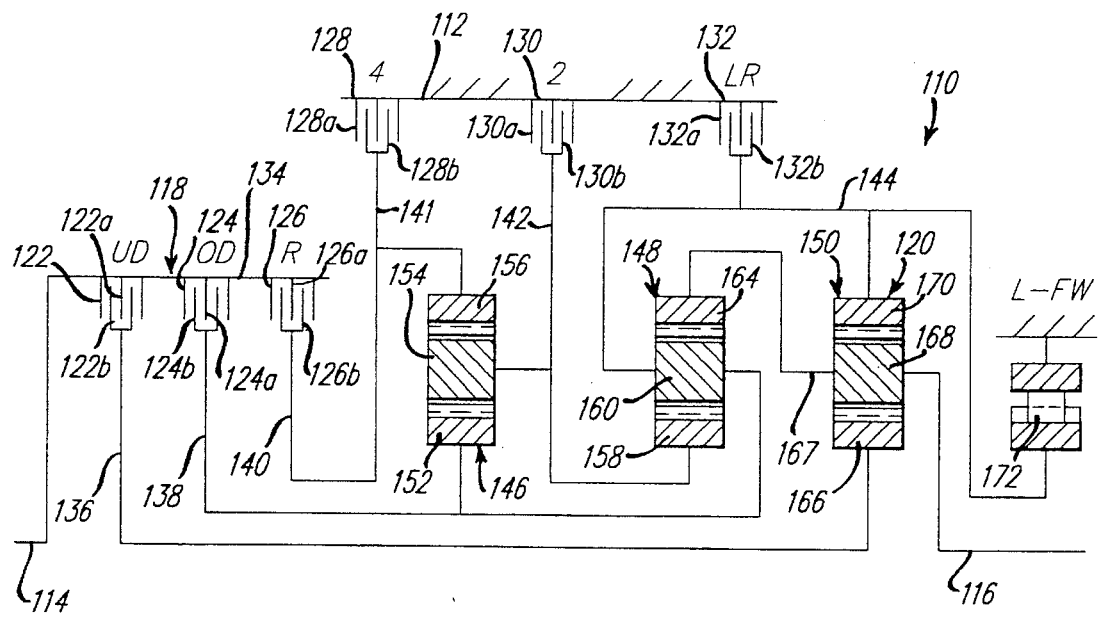
FIG. 3 is a cross-sectional schematic view of another embodiment, according to the present invention, of the four-speed automatic transmission of FIG. 1.
FIG. 4 is a chart of gear ratio and friction elements applied for alternative second and fourth gears of the four-speed automatic transmission of FIGS. 1 or 3.

Referring to FIG. 3, another embodiment 110 of the four-speed automatic transmission 10 is shown. Like parts of the four-speed automatic transmission 10 have like reference numerals increased by one hundred (100). The gear assembly 120 includes a front or first planetary gearset, generally indicated at 146, an axially spaced intermediate or second planetary gearset, generally indicated at 148, and an axially spaced rear or third planetary gearset, generally indicated at 150. The first planetary gearset 146 includes a first sun gear 152 at its center. The first sun gear 152 is connected to the overdrive hub 138. The first planetary gearset 146 also includes a first planetary carrier 154 having a plurality of circumferentially spaced first pinion gears to engage the first sun gear 152. The first planetary carrier 154 is connected to the second hub 142 of the second brake assembly 130. The first planetary gearset 146 further includes a first annulus gear 156 disposed about the first planetary carrier 154 and which engages the first pinion gears. The first annulus gear 156 is connected to the first hub 141 of the fourth brake assembly 128. The ratio of the number of teeth on the sun gear 152 to the number of teeth on the annulus gear 156 in this example is 0.50.

The intermediate or second planetary gearset 148 includes a second sun gear 158 at its center which is connected to the second hub 142 of the second brake assembly 130. The second planetary gearset 148 also includes a second planetary carrier 160 having a plurality of circumferentially spaced second pinion gears to engage the second sun gear 158. The second planetary carrier 160 is connected to the first connecting member 144 and to the first sun gear 152 and overdrive clutch hub 138. The second planetary gearset 148 further includes a second annulus gear 164 disposed about the second planetary carrier 160 and which engages the second pinion gears. The second annulus gear 164 is connected to the third planetary gearset 150 to be described. The ratio of the number of teeth on the sun gear 158 to the number of teeth on the annulus gear 164 in this example is 0.50.

The rear or third planetary gearset 150 includes a third sun gear 166 at its center which is connected to the underdrive hub 136. The third planetary gearset 150 also includes a third planetary carrier 168 having a plurality of circumferentially spaced third pinion gears to engage the third sun gear 166. The third planetary carrier 68 includes a connecting member 169 connected to the second annulus gear 164. The third planetary carrier 168 is also connected to the output member 116 of the transmission 110. The third planetary gearset 150 further includes a third annulus gear 170 disposed about the third planetary carrier 168 and which engages the third pinion gears. The third annulus gear 170 is connected to the first connecting member 144. The first connecting member 144 is connected to a one-way or freewheel clutch 172 to prevent reverse rotation of the first connecting member 144. The ratio of the number of teeth on the sun gear 166 to the number of teeth on the annulus gear 170 in this example is 0.50.

In operation, the input member 114 of the transmission 110 rotates due to torque being transferred from the rotating crankshaft of the engine and through the torque converter (not shown) to the input member 114. The input retainer 134 also rotates with the input member 114 due to its connection. The input retainer 134 and plates 122a, 124a, 126a also rotate with the input member 114 due to the connection of the input retainer 134 to the input member 114.

When the underdrive clutch assembly 122 is applied, the rotating plates 122a and discs 122b of the underdrive clutch assembly 122 engage each other and a frictional force is produced between the plates 122a and discs 122b. Because the input retainer 134 and plates 122a are rotating, the frictional force causes the discs 122b and underdrive hub 136 to rotate, in turn, rotating the sun gear 166 of the third planetary gearset 150.

When the overdrive clutch assembly 124 is applied, the rotating plates 124a and discs 124b of the overdrive clutch assembly 124 engage each other and a frictional force is produced between the plates 124a and discs 124b. Because the input retainer 134 and plates 124a are rotating, the frictional force causes the discs 124b and overdrive hub 138 to rotate, in turn, rotating the first sun gear 152 and the second planetary carrier 160, first connecting member 144, and third annulus gear 170.

When the reverse clutch assembly 126 is applied, the rotating plates 126a and discs 126b of the reverse clutch assembly 126 engage each other and a frictional force is produced between the plates 126a and discs 126b. Because the input retainer 134 and plates 126a are rotating, the frictional force causes the discs 126b and reverse hub 140 and first hub 141 to rotate, in turn, rotating the first annulus gear 156.

When the fourth brake assembly 128 is applied, the plates 128a and discs 128b of the fourth brake assembly 128 engage each other and a frictional force is produced between the plates 128a and discs 128b. Because the plates 128a do not rotate or are stationary, as they are connected to the transmission housing 112, the frictional force holds the discs 128b and first hub 141 stationary, in turn, holding the first annulus gear 156 stationary.

When the second brake assembly 130 is applied, the plates 130a and discs 130b of the second brake assembly 130 engage each other and a frictional force is produced between the plates 130a and discs 130b. Because the plates 130a are stationary, as they are connected to the transmission housing 112, the frictional force holds the discs 130b and second hub 142 stationary, in turn, holding the first planetary carrier 154 of the first planetary gearset 146 and the second sun gear 158 of the second planetary gearset 148 stationary.

When the low/reverse brake assembly 132 is applied, the plates 132a and discs 132b of the low/reverse brake assembly 132 engage each other and a frictional force is produced between the plates 132a and discs 132b. Because the plates 132a are stationary, as they are connected to the transmission housing 112, the frictional force holds the discs 132b stationary, in turn, holding the first connecting member 144, second planetary carrier 160, first sun gear 152 and third annulus gear 170 stationary.

Referring to FIG. 3, when the transmission 110 is desired to operate in first gear, the underdrive clutch assembly 122 is applied. This causes the third sun gear 166 to rotate and the third annulus gear 170 to be held stationary by the one-way clutch 172. As a result, rotation of the third sun gear 166 causes rotation of the third pinion gears and the third planetary carrier 168. Because the output member 116 is connected to the third planetary carrier 168, rotation of the third planetary carrier 168 causes the output member 116 to rotate. This arrangement of the gear assembly 120 produces a gear ratio of 3.00.

When the transmission 110 is desired to operate in second gear, the underdrive clutch assembly 122 and the second brake assembly 130 are applied. This causes the third sun gear 166 to rotate and the second sun gear 158 to be held stationary. By holding the second sun gear 158 stationary, the third annulus gear 170 rotates, in turn, further rotating the third pinion gears and the third planetary carrier 168 which increase in speed. As a result, the third planetary carrier 168 and output member 116 rotate at a greater r.p.m. than in first gear. This arrangement of the gear assembly 120 produces a gear ratio of 1.67.

When the transmission 110 is desired to operate in third gear, the underdrive clutch assembly 122 and the overdrive clutch assembly 124 are applied. This causes the third sun gear 166 and the third annulus gear 170 to rotate at the same r.p.m. As a result, the third planetary carrier 168 and output member 116 also rotate at the same r.p.m., which is at a higher r.p.m. than in second gear. This arrangement of the gear assembly 120 produces a gear ratio of 1.00.

When the transmission 110 is desired to operate in fourth gear, the overdrive clutch assembly 124 and the fourth brake assembly 128 are applied. This causes the first sun gear 152 and second planetary carrier 160 to rotate and the first annulus gear 156 to be held stationary which causes the first planetary carrier 154 and second sun gear 158 to rotate. As a result, rotation of the second planetary carrier 160 causes the second pinion gears and second annulus gear 164 to rotate. Rotation of the second annulus gear 164 causes the output member 116 to rotate at a greater r.p.m. than in third gear. This arrangement of the gear assembly 120 produces a gear ratio of 0.75.

When the transmission 110 is desired to operate in reverse gear, the reverse clutch assembly 126 and low/reverse brake assembly 132 are applied. This causes the first annulus gear 156 to rotate and the second planetary carrier 160 and first sun gear 152 to be held stationary. As a result, the first planetary carrier 154 and second sun gear 158 rotate the second pinion gears which, in turn, rotate the second annulus gear 164 backwards. Rotation of the second annulus gear 164 causes rotation of the output member 116 in a direction opposite to the other gear positions. This arrangement of the gear assembly 120 produces a gear ratio of −3.00.

Referring to FIG. 4, alternative second and fourth gear ratios are available for the four-speed automatic transmission 10,110 by applying the fourth brake 28,128 instead of the second brake 30,130 in second gear, which gives a ratio of 1.50 with either of the transmissions 10 or 110. Applying the second brake 30,130 instead of the fourth brake 28,128 in fourth gear gives a ratio of 0.67. These alternative ratios may be useful in certain situations.

Accordingly, the four-speed automatic transmission 10,110 has a unique arrangement of the planetary gearsets 46,146, 48,148 and 50,150 to achieve a 0.75 overdrive ratio in fourth gear and a satisfactory first to second step of 3.00 to 1.67. The unique arrangement of the planetary gearsets 46, 48 and 50 results in loading only the second planetary gearset 48 in fourth gear, thereby reducing efficiency loss.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A four-speed automatic transmission for a vehicle comprising:

a transmission housing;

an input member;

an output member;

three planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to said transmission housing;

first means for allowing said output member and a planetary carrier from one of said planetary gearsets and an annulus gear of another of said planetary gearsets to rotate simultaneously;

said planetary gearsets comprising a first planetary gearset, a second planetary gearset axially spaced from said first planetary gearset and a third planetary gearset axially spaced from said second planetary gearset, said first planetary gearset being disposed between said input member and said second planetary gearset and said third planetary gearset being disposed between said second planetary gearset and said output member;

each of said first, second and third planetary gearsets comprising a sun gear, an annulus gear and a planetary carrier having a plurality of circumferentially spaced pinion gears disposed between said sun gear and said annulus gear; and second means for allowing said sun gear of said first planetary gearset and said planetary carrier of said second planetary gearset and said annulus gear of said third planetary gearset to rotate or remain stationary simultaneously.

2. A four-speed automatic transmission as set forth in claim 1 wherein said clutch assemblies comprises a first clutch assembly to couple said input member to said sun gear of said third planetary gearset, a second clutch assembly to couple said input member to said second planetary carrier of said second planetary gearset and said first sun gear of said first planetary gearset, and a third clutch assembly to couple said input member to said annulus gear of said first planetary gearset.

3. A four-speed automatic transmission as set forth in claim 1 wherein said brake assemblies comprises a first brake assembly to couple said transmission housing to said annulus gear of said first planetary gearset, a second brake assembly to couple said transmission housing to said planetary carrier of said first planetary gearset and said sun gear of said second planetary gearset, and a third brake assembly to couple said transmission housing to said annulus gear of said third planetary gearset, said planetary carrier of said second planetary gearset, and said sun gear of said first planetary gearset.

4. A four-speed automatic transmission for a vehicle comprising:

a transmission housing;

an input member;

an output member;

three planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to said transmission housing;

means for allowing said output member and a planetary carrier from one of said planetary gearsets and an annulus gear of another of said planetary gearsets to rotate simultaneously;

said planetary gearsets comprising a first planetary gearset, a second planetary gearset axially spaced from said first planetary gearset and a third planetary gearset axially spaced from said second planetary gearset;

each of said first, second and third planetary gearsets comprising a sun gear, an annulus gear and a planetary carrier having a plurality of circumferentially spaced pinion gears disposed between said sun gear and said annulus gear; and wherein said clutch assemblies comprises a first clutch assembly to couple said input member to said sun gear of said third planetary gearset, a second clutch assembly to couple said input member to said second planetary carrier of said second planetary gearset and said first sun gear of said first planetary gearset and said third annulus gear of said third planetary gearset, and a third clutch assembly to couple said input member to said sun gear of said second planetary gearset and said annulus gear of said first planetary gearset.

5. A four-speed automatic transmission for a vehicle comprising:

a transmission housing;

an input member;

an output member;

three planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to said transmission housing;

means for allowing said output member and a planetary carrier from one of said planetary gearsets and an annulus gear of another of said planetary gearsets to rotate simultaneously;

said planetary gearsets comprising a first planetary gearset, a second planetary gearset axially spaced from said first planetary gearset and a third planetary gearset axially spaced from said second planetary gearset;

each of said first, second and third planetary gearsets comprising a sun gear, an annulus gear and a planetary carrier having a plurality of circumferentially spaced pinion gears disposed between said sun gear and said annulus gear; and wherein said brake assemblies comprises a first brake assembly to couple said transmission housing to said sun gear of said second planetary gearset and said annulus gear of said first planetary gearset, a second brake assembly to couple said transmission housing to said planetary carrier of said first planetary gearset, and a third brake assembly to couple said transmission housing to said sun gear of said first planetary gearset, said annulus gear of said third planetary gearset and said planetary carrier of said second planetary gearset.

6. A gear assembly for a four-speed automatic transmission of a vehicle for changing a ratio of torque between an input member and an output member, said gear assembly comprising:

a first planetary gearset;

a second planetary gearset axially spaced from said first planetary gearset;

a third planetary gearset axially spaced from said second planetary gearset, said first planetary gearset being disposed between an input member and said second planetary gearset and said third planetary gearset being disposed between said second planetary gearset and an output member;

each of said first and second and third planetary gearsets comprising a sun gear, an annulus gear and a planet carrier having a plurality of circumferentially spaced pinion gears disposed between said sun gear and said annulus gear;

first means for allowing said annulus gear of said second planetary gearset and said planetary carrier of said third planetary gearset to rotate simultaneously; and second means for allowing said sun gear of said first planetary gearset and said planetary carrier of said second planetary gearset and said annulus gear of said third planetary gearset to remain stationary or to rotate simultaneously.

7. A gear assembly as set forth in claim 6 including means for allowing said sun gear of said second planetary gearset and said planetary carrier of said first planetary gearset to rotate simultaneously.

8. A gear assembly for a four-speed automatic transmission of a vehicle for changing a ratio of torque between an input member and an output member, said gear assembly comprising:

a first planetary gearset;

a second planetary gearset axially spaced from said first planetary gearset;

a third planetary gearset axially spaced from said second planetary gearset, said first planetary gearset being disposed between an input member and said second planetary gearset and said third planetary gearset being disposed between said second planetary gearset and an output member;

each of said first and second and third planetary gearsets comprising a sun gear, an annulus gear and a planet carrier having a plurality of circumferentially spaced pinion gears disposed between said sun gear and said annulus gear;

first means for allowing said annulus gear of said second planetary gearset and said planetary carrier of said third planetary gearset to rotate simultaneously; and second means for allowing said sun gear of said second planetary gearset and said annulus gear of said first planetary gearset to remain stationary or to rotate simultaneously.

9. A four-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset, said first planetary gearset being disposed between said input member and said second planetary gearset and said third planetary gearset being disposed between said second planetary gearset and said output member;

said first and second and third planetary gearsets comprising a sun gear, an annulus gear and a planetary carrier having a plurality of circumferentially spaced pinion gears disposed between said sun gear and said annulus gear;

first means for allowing said annulus gear of said second planetary gearset and said planetary carrier of said third planetary gearset and said output member to rotate simultaneously;

a first brake assembly to selectively couple said planetary carrier of said first planetary gearset to said transmission housing to remain stationary simultaneously; and second means for allowing said sun gear of said first planetary gearset and said planetary carrier of said second planetary gearset and said annulus gear of said third planetary gearset to remain stationary or to rotate simultaneously.

10. A four-speed automatic transmission as set forth in claim 9 including second means for allowing said sun gear of said second planetary gearset and said annulus gear of said first planetary gearset to remain stationary or to rotate simultaneously.

11. A four-speed automatic transmission as set forth in claim 9 including a first clutch assembly to selectively couple said input member to said annulus gear of said first planetary gearset.

12. A five-speed automatic transmission as set forth in claim 9 including a first clutch assembly to selectively couple said input member to said sun gear of said third planetary gearset.

13. A four-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset, said first planetary gearset being disposed between said input member and said second planetary gearset and said third planetary gearset being disposed between said second planetary gearset and said output member;

said first and second and third planetary gearsets comprising a sun gear, an annulus gear and a planetary carrier having a plurality of circumferentially spaced pinion gears disposed between said sun gear and said annulus gear;

first means for allowing said annulus gear of said second planetary gearset and said planetary carrier of said third planetary gearset and said output member to rotate simultaneously;

a first brake assembly to selectively couple said planetary carrier of said first planetary gearset to said transmission housing to remain stationary simultaneously; and second means for allowing said sun gear of said first planetary gearset and said planetary carrier of said second planetary gearset to rotate simultaneously.

14. A four-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said annulus gear of said second planetary gearset and said planetary carrier of said third planetary gearset and said output member to rotate simultaneously;

a first brake assembly to selectively couple said planetary carrier of said first planetary gearset to said transmission housing to remain stationary simultaneously; and a second brake assembly to selectively couple said sun gear of said first planetary gearset and said planetary carrier of said second planetary gearset and said annulus gear of said third planetary gearset to said transmission housing to remain stationary simultaneously.

15. A four-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said annulus gear of said second planetary gearset and said planetary carrier of said third planetary gearset and said output member to rotate simultaneously;

a first brake assembly to selectively couple said planetary carrier of said first planetary gearset to said transmission housing to remain stationary simultaneously; and a first clutch assembly to selectively couple said input member to said sun gear of said second planetary gearset and said annulus gear of said second planetary gearset to rotate simultaneously.

16. A four-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

first means for allowing said annulus gear of said second planetary gearset and said planetary carrier of said third planetary gearset and said output member to rotate simultaneously;

second means for allowing said sun gear of said first planetary gearset and said planetary carrier of said second planetary gearset and said annulus gear of said third planetary gearset to remain stationary or to rotate simultaneously;

third means for allowing said sun gear of said second planetary gearset and said annulus gear of said first planetary gearset to remain stationary or to rotate simultaneously;

a first brake assembly to selectively couple said sun gear of said second planetary gearset and said annulus gear of said first planetary gearset to said transmission housing;

a second brake assembly to selectively couple said planetary carrier of said second planetary gearset to said transmission to remain stationary simultaneously;

a third brake assembly to selectively couple said sun gear of said first planetary gearset and said planetary carrier of said second planetary gearset and said annulus gear of said third planetary gearset to said transmission housing to remain stationary simultaneously;

a first clutch assembly to selectively couple said input member to said sun gear of said third planetary gearset;

a second clutch assembly to selectively couple said input member to said planetary carrier of said second planetary gearset and said sun gear of said first planetary gearset and said annulus gear of said third planetary gearset; and a third clutch assembly to selectively couple said input member to said sun gear of said second planetary gearset and said annulus gear of said first planetary gearset to rotate simultaneously.

17. A four-speed automatic transmission for a vehicle comprising:

a transmission-housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

first means for allowing said annulus gear of said second planetary gearset and said planetary carrier of said third planetary gearset and said output member to rotate simultaneously;

second means for allowing said planetary carrier of said second planetary gearset, said annulus gear of said third planetary gearset and said sun gear of said first planetary gearset to remain stationary or to rotate simultaneously;

third means for allowing said sun gear of said second planetary gearset and said planetary carrier of said first planetary gearset to remain stationary or to rotate simultaneously;

a first brake assembly to selectively couple said annulus gear of said first planetary gearset to said transmission housing to remain stationary simultaneously;

a second brake assembly to selectively couple said planetary carrier of said first planetary gearset and said sun gear of said second planetary gearset to said transmission housing to remain stationary simultaneously;

a third brake assembly to selectively couple said planetary carrier of said second planetary gearset, said annulus gear of said third planetary gearset and said sun gear of said first planetary gearset to said transmission housing to remain stationary simultaneously;

a first clutch assembly to selectively couple said input member to said sun gear of said third planetary gearset;

a second clutch assembly to selectively couple said input member to said planetary carrier of said second planetary gearset, said sun gear of said first planetary gearset and said annulus of said third planetary gearset; and a third clutch assembly to selectively couple said input member to said annulus gear of said first planetary gearset to rotate simultaneously.

* * * * *